US006532029B1

(12) United States Patent
Lee

(10) Patent No.: US 6,532,029 B1
(45) Date of Patent: Mar. 11, 2003

(54) IMAGING-OFFSET COMPENSATION METHODS AND SYSTEMS

(75) Inventor: Wen-hsiung Lee, Hsinchu (TW)

(73) Assignee: Aetas Technology Incorporated, Irvine, CA (US)

( * ) Notice: Subject to any disclaimer, the term of this patent is extended or adjusted under 35 U.S.C. 154(b) by 0 days.

(21) Appl. No.: 09/718,069

(22) Filed: Nov. 21, 2000

(51) Int. Cl.⁷ .................... B41J 2/385; G01D 15/06; G03G 15/01
(52) U.S. Cl. ........................... 347/116; 347/130
(58) Field of Search ................ 347/116, 130, 347/238

(56) References Cited

U.S. PATENT DOCUMENTS

| | | | |
|---|---|---|---|
| 5,196,864 A | * | 3/1993 | Caine |
| 5,471,550 A | * | 11/1995 | Kurachi |
| 5,831,626 A | * | 11/1998 | Sano et al. |
| 6,002,413 A | * | 12/1999 | Nishizawa et al. ......... 347/116 |
| 6,055,005 A | * | 4/2000 | Appel et al. ................ 347/116 |
| 6,055,006 A | * | 4/2000 | Murano |
| 6,198,896 B1 | * | 3/2001 | Nakayasu et al. ...... 347/116 X |
| 6,408,156 B1 | * | 6/2002 | Miyazaki et al. ........... 347/116 |

FOREIGN PATENT DOCUMENTS

| | | | |
|---|---|---|---|
| JP | 64-4775 | * | 1/1989 |
| JP | 4-45966 | * | 2/1992 |
| JP | 4-281476 | * | 10/1992 |
| JP | 8-204924 | * | 8/1996 |
| JP | 9-247428 | * | 9/1997 |

* cited by examiner

Primary Examiner—Susan S. Y. Lee
(74) Attorney, Agent, or Firm—Frederic M. Douglas

(57) ABSTRACT

Imaging offset problems in imaging systems, such as electrophotographic (EPG) printers and copiers, are overcome. Imaging offset results from misaligned exposure units that, when uncompensated, produce dots on a photoreceptor belt at exposure positions that are offset from ideal dot positions. An imaging-offset compensating method of the invention first determines the imaging offset, which is a distance that may include a magnitude and a direction. The imaging offset is determined with respect to the ideal dot position. A time factor is then determined based on the magnitude of the imaging offset for each exposure unit. The time at which each exposure unit is actuated is modified by a respective time factor so that a dot produced by each exposure unit matches the ideal dot location thereof.

15 Claims, 14 Drawing Sheets

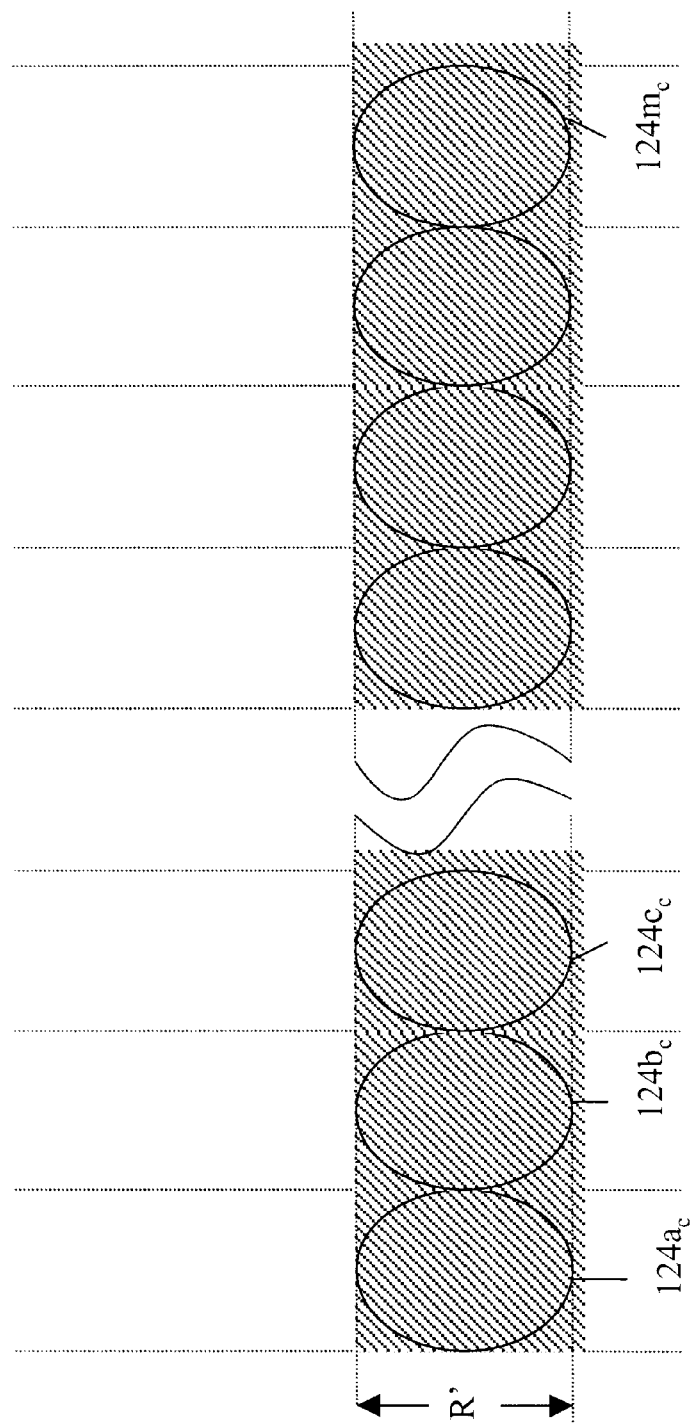

IMAGING-OFFSET COMPENSATION METHODS AND SYSTEMS

BACKGROUND OF THE INVENTION

1. Field of the Invention

The present invention relates generally to imaging systems and, more particularly, to a method and a system for compensating for an offset of a dot or series of dots in an imaging system, such as in an electrophotographic system (e.g., color printers).

2. Description of the Related Art

One of the difficulties in designing imaging systems such as electrophotographic (EPG) printers, inkjet printers, and laser printers is overcoming a problem known as "imaging offset." This problem results in poor image quality in both monocolor (i.e., black and white) and multicolor systems. To better understand the background of this problem, imaging offset will be explained with reference to an EPG printer.

In general, imaging offset results from physically misaligned exposure units, e.g., light-emitting diodes (LEDs), that are used in the EPG printer to form an image. Exposure units may become misaligned from either errors during the manufacturing process or damage to the EPG printer after manufacture. Additionally, to ensure that exposure units are perfectly aligned, strict manufacturing tolerances must be maintained, which is difficult and increases costs.

In an EPG system such as a printer or a copier, an electrostatic latent image is formed on a charged surface of a photoreceptor by exposing the photoreceptor with a high-intensity light source such as an LED array. Prior to exposure, the surface of the photoreceptor is uniformly charged. The LEDs then create a charged pattern (known as a "latent image") corresponding to the image that is to be printed. The latent image is then developed into a toner image by adhering charged toner particles to the charged pattern on the photoreceptor. The toner image is transferred to paper using an electrostatic transfer process. The toner image is then fused to the paper by heat. The photoreceptor is then cleaned prior to the next imaging cycle of the system.

Imaging offset occurs in the EPG imaging process at the point when the LEDs create the charged pattern. As mentioned above, LEDs may be misaligned during the manufacturing process (e.g., mounting of LED chips) or after the manufacturing process due to damage to the EPG printer or any intermediary device (e.g., SFL error). Misaligned LEDs are offset from an ideal linearity by different distances. An image resulting from this nonlinear array of LEDs is of poor quality.

Imaging offset similarly occurs in multicolor imaging. Multicolor EPG copying and printing requires the EPG process explained above for monocolor images to be repetitively performed for each color. Different stations for each of the different colors (e.g., yellow, magenta, cyan, and black) apply toner of a specific color. In multicolor imaging, the toner powder images should be superimposed upon each other in near perfect registry (or alignment) to produce high-quality color images. If misregistration occurs, the color images may blur, and color hue shifts may occur. Misaligned LEDs therefore cause these registration problems.

In view of the foregoing, a need exists for a method and a system for compensating for imaging offset to avoid the linearity and registration problems described above.

SUMMARY OF THE INVENTION

The present invention overcomes the imaging-offset drawbacks of conventional imaging systems and provides imaging systems that produce clear, crisp, and true-color images free from imaging offset.

According to one aspect of the present invention, a method of compensating for imaging offset of a dot produced by an exposure unit on a substrate in an imaging system. The dot has an uncompensated dot position and an ideal dot position. The uncompensated dot position is out of alignment with the ideal dot position. To compensate for this misalignment, the imaging offset is determined as a distance between the ideal dot position and the uncompensated dot position. Based on the determined imaging offset, the uncompensated dot position is then matched to the ideal dot position.

One of the advantages of the present invention is that imaging offset is substantially eliminated in the imaging process. Accordingly, images produced by, for example, printers and copiers are clear, crisp, and free of errors. In addition, images produced by color systems do not suffer from registration problems of one color upon the other. Accordingly, color image provide clear, true colors.

Cost savings is another advantage of the present invention. More specifically, conventional approaches attempting to reduce imaging offset by apply strict manufacturing tolerances during the production of, for example, light-emitting diode (LED) printer heads (LPHs). This strict adherence is expensively and, ultimately, falls short of success because of the size and number of diodes in the LPHs. In accordance with the present invention, imaging offset may be corrected regardless of the misalignment in diodes of the LPHs. Accordingly, inexpensively produced LPHs may be used to produce images of the highest quality.

The matching of the dot to the ideal dot position may be accomplished, for example, by delaying a formation of the dot on the substrate by an amount of time corresponding to the imaging offset. Alternatively, a time factor based on the imaging offset may be determined. The exposure unit may then be actuated to produce a dot at a time modified by the time factor. The time factor may be based on both a magnitude of the distance of the imaging offset, as well as a direction of the imaging offset.

Another advantage of the present invention related to the applicability of its methodology. More specifically, the compensation method may be implemented by an on-board software module. In alternative embodiments, the method of the present invention may performed from a remote location. In this embodiment, an imaging system is in communication with a processor that causes the exposure unit to be actuated so that the dot is produced at the ideal dot position.

Other aspects, features, and advantages of the present invention will become apparent as the invention becomes better understood by reading the following description in conjunction with the accompanying drawings.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein:

FIG. 3C is a diagram view of aligned dots that have been compensated in accordance with the principles of the present invention;

DETAILED DESCRIPTION OF THE PREFERRED EMBODIMENTS

Figure 1:
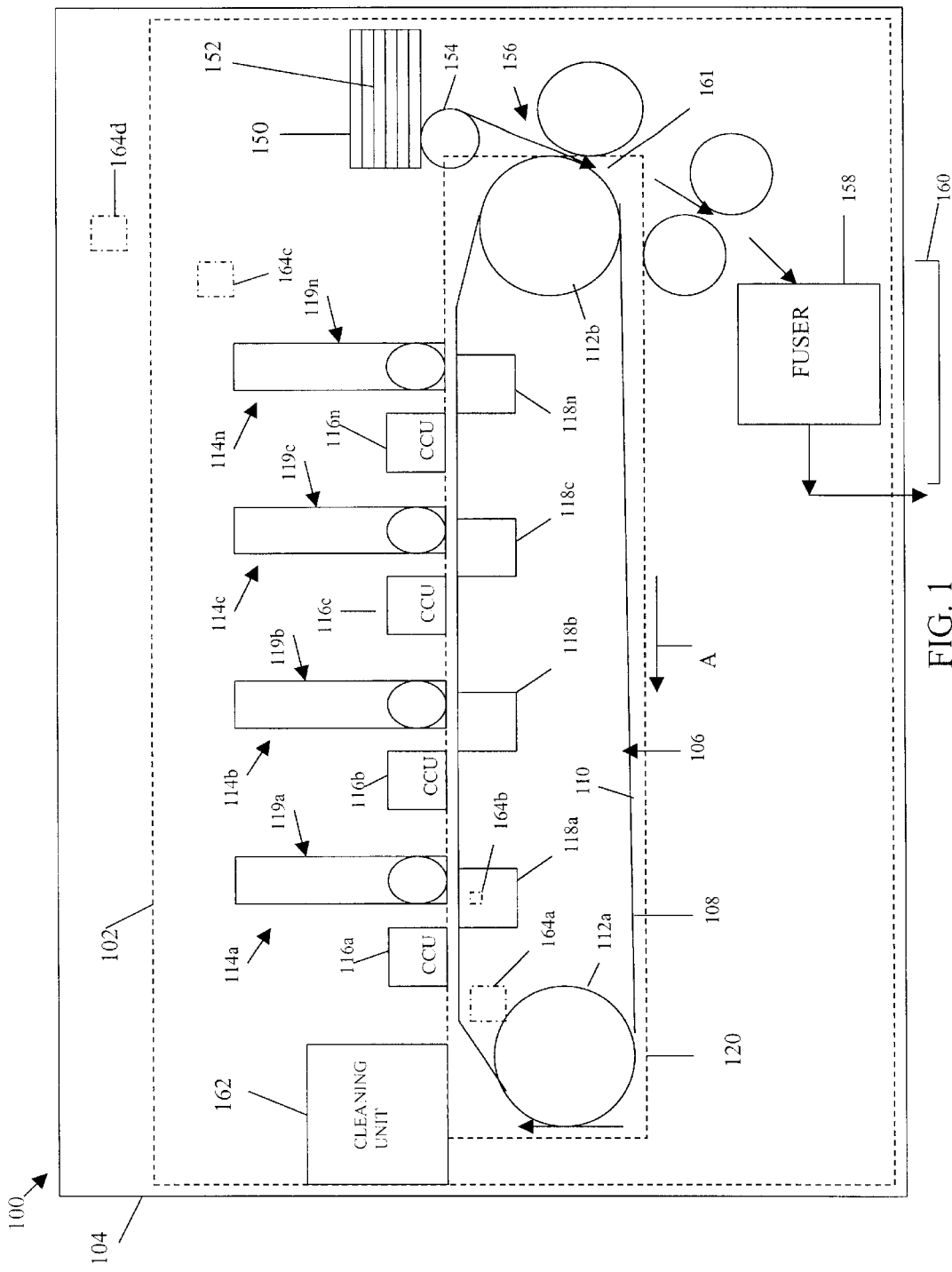
FIG. 1 is a diagram view of an exemplary embodiment of an electrophotographic (EPG) system configured in accordance with the principles of the present invention.

Referring to the drawings in more detail, an exemplary imaging system 100 configured in accordance with the principles of the present invention is shown in FIG. 1. The imaging system 100 of the invention includes hardware and software for producing images, such as color photocopies, that are crisp, clear, and free from imaging offset.

For the purposes of this description, exemplary embodiments for a method and a system of the present invention for compensating for imaging offset in an imaging system are described in detail with reference to an electrophotographic (EPG) system. It is understood, however, that the method and the system of the present invention is widely applicable to imaging systems that incorporate a variety of imaging technology, such as lasers, inkjet, tone jet, bubblejet, and other techniques for creating an image.

Exemplary imaging system 100 includes an EPG subsystem 102 enclosed within a housing 104. The EPG subsystem 102 and the housing 104 may be combined and configured to form various embodiments of the imaging system 100, such as a printer (monocolor or multicolor), a copier (monocolor or multicolor), a scanner, or any image-forming system that is a combination of these devices. For the purposes of this description, the imaging system 100 is depicted as a multicolor printer in FIG. 1.

Exemplary EPG subsystem 102 includes a flexible, transparent photoreceptor belt 106 with an outer surface 108 and an inner surface 110. The photoreceptor belt 106 is driven in a continuous path in a direction indicated by arrow A at a velocity v by rollers 112a and 112b. In one embodiment, the photoreceptor belt 106 is a substrate upon which images are formed as described in detail below. Along a portion of the path are disposed a plurality of printing stations 114a, 114b, 114c, . . . , 114n. For example, four printing stations 114 are shown in FIG. 1, although it is understood that the number of printer stations may vary in other embodiments of the invention, such as a single printer station for monocolor EPG systems.

Each of the printing stations 114 respectively produces a differently colored image, in superimposed relation, on the outer surface 108 of the photoreceptor belt 106. In alternative embodiments, for example, where one printing station is used, the colors (e.g., yellow, magenta, cyan, and black) may be superimposed to produce differently colored images by passing the photoreceptor belt 106 past the single printing station four times, rather than only once when four printing stations are used. One skilled in the art will understand that various numbers of printing stations may be used to create color images, with only the number of passes of the photoreceptor belt 106 being changed.

Each of the printing stations 114a–114n includes a corona charging unit 116a, 116b, 116c, . . . , 116n disposed adjacent to or near the outer surface 108 of the photoreceptor belt 106. The charging units 116 apply a uniform charge to the belt 106. Located downstream from each charging unit 116 is a light source 118a, 118b, 118c, . . . , 118n, for example, a laser or a light-emitting diode (LED) printer head (LPH). The light sources 118 are disposed at or near the inner surface 110 of the photoreceptor belt 106. The light sources 118 include exposure units such as LEDs that are selectively actuated to project light corresponding to a single-color image on the photoreceptor belt 106, thereby discharging, at appropriate locations on the outer surface 108, the uniform electrostatic charge provided by the charging units 116 to produce an electrostatic charge image.

According to one particular embodiment of the invention, exemplary imaging system 100 includes an EPG module 120 that is configured to be releasably engageable with and, therefore, removable from the EPG subsystem 102. The removable EPG module 120 may include the photoreceptor belt 106, the rollers 112, and the light sources 118. Exemplary module 120 may also include a handle (not shown) to facilitate the removal of the EPG module 120 from the imaging system 100. The removably configured EPG module 120 allows easy maintenance of the EPG subsystem 102 and replacement with another EPG module, if necessary or desired. A replacement EPG module may be identical to the EPG module 120 to be replaced or, in alternative embodiments, may include a different number or type of light sources, a different type of photoreceptor belt, or different rollers. In addition, in view of rapidly advancing technology, the removable EPG module 120 allows an end user to upgrade to a later-developed module of improved quality, faster speed, higher resolution, and so on.

Figure 2A:
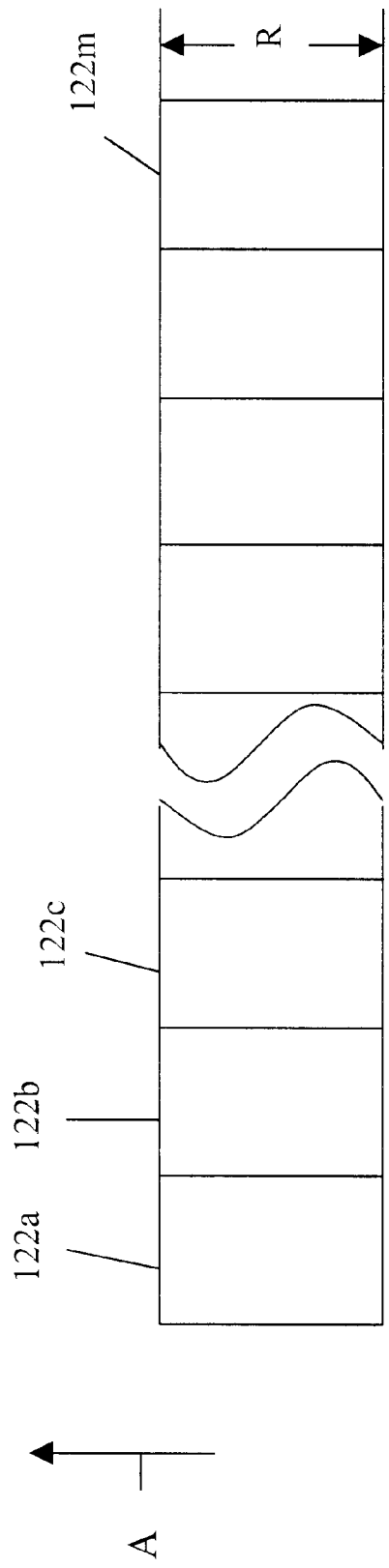
FIG. 2A is a diagram view of an ideally aligned array of exposure units.

With additional reference to FIG. 2A, each light source 118 may includes a plurality of exposure units 122a, 122b, 122c, . . . 122m configured in a linear array. The exposure units 122 are selectively actuated to emit light, corresponding to an image to be formed, that is incident on the photoreceptor belt 106 (not shown in FIG. 2A) moving adjacent to the exposure units 122 as indicated by arrow A. The emitted light exposes the photoreceptor belt 106 with the image to be formed by passing through the belt 106 and discharging the uniform electrostatic charge provided by the charging units 116 at appropriate locations on the outer surface 108 of the belt 106. A charged pattern known as a latent image is formed on the outer surface 108 of the photoreceptor belt 106.

Figure 2B:
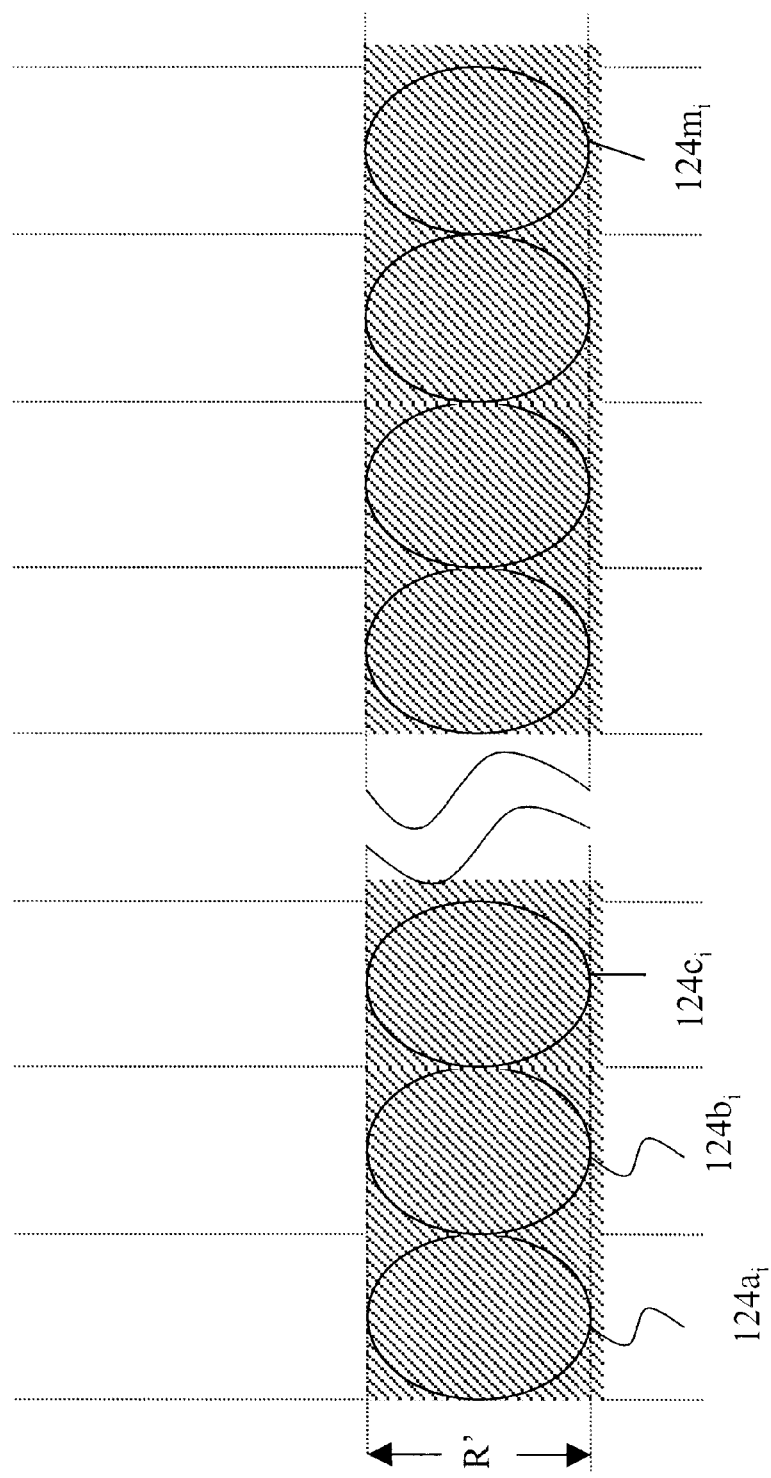
FIG. 2B is a diagram view of ideally aligned dots exposed by the exposure units of FIG. 2A.

The exposure units 122 of each light source 118 are ideally aligned and linear in configuration within an alignment range R as shown in FIG. 2A. When actuated, the aligned exposure units 122 respectively produce correspondingly aligned dots 124a, 124b, 124c, . . . 124m on the moving photoreceptor belt 106 as shown in FIG. 2B. Each dot 124 is an electrically discharged area on the photoreceptor belt 106. The collective arrangement of dots 124 defines a latent image of the image to be printed on a sheet of paper. FIG. 2B illustrates ideal dot positions 124$a_i$, 124$b_i$, 124$c_i$, . . . , 124$m_i$, which are the positions on a photoreceptor belt at which the dots 124 are perfectly aligned and linear within an exposed alignment range R' and, therefore, do not suffer from imaging offset.

Figure 3A:
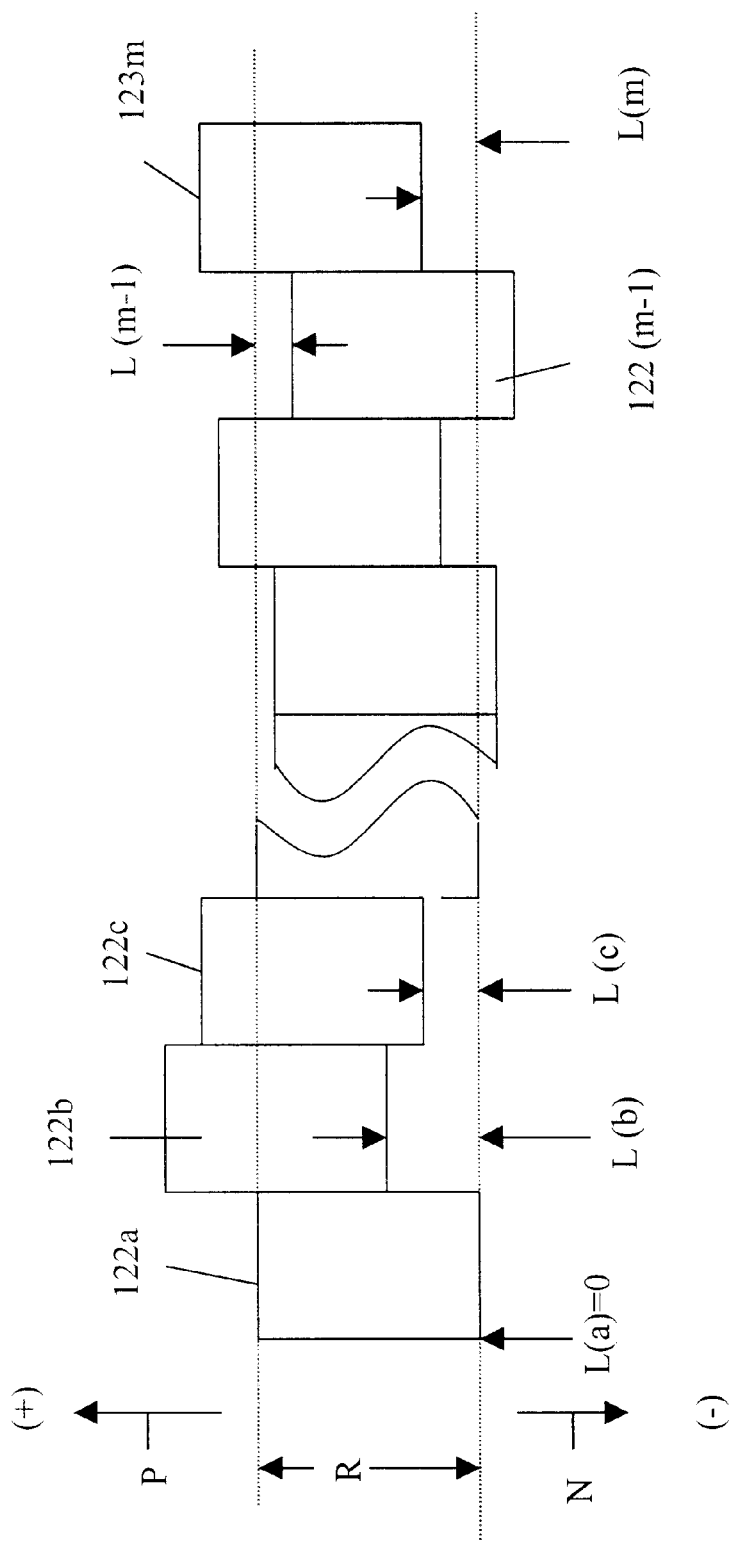
FIG. 3A is a diagram view of an array of exposure units that are out of alignment.
Figure 3B:
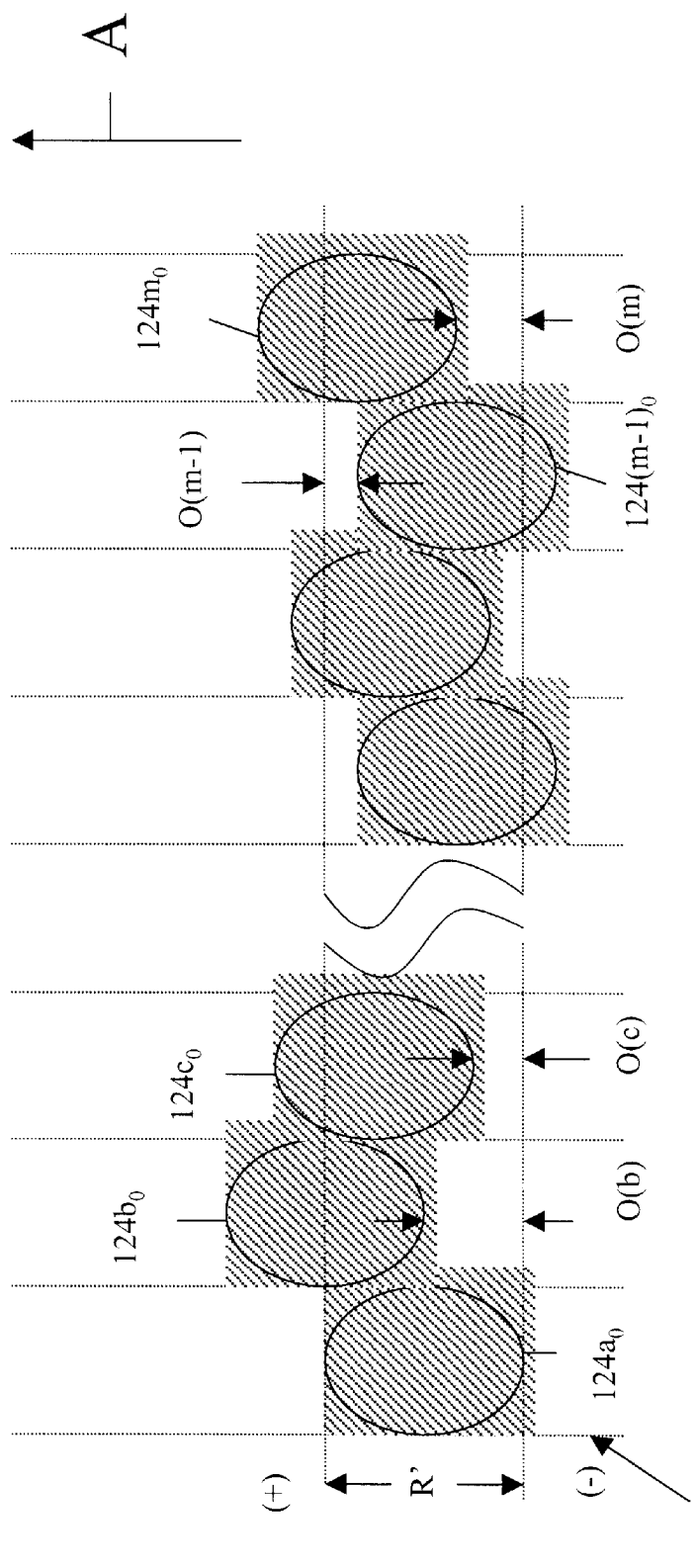
FIG. 3B is a diagram view of dots exposed by the exposure units of FIG. 3A that suffer from imaging offset.

In reality the exposure units 122 are not perfectly aligned as shown in FIG. 2A but are, rather, misaligned as shown in FIG. 3A. As mentioned above, imaging offset results from a misalignment of the exposure units 122. Any number of the exposure units 122 of FIG. 3A are out of alignment and offset from the alignment range R by an alignment offset L. The misaligned exposure units 122 produce dots that are correspondingly offset from the ideal dot position and the exposure alignment range R', as shown in FIG. 3B, if the exposure units 122 are actuated without compensation, which offset is known as imaging offset. For the purposes of this description, each of the exposure units 122 has an exposure unit position which is defined as the physical location of each exposure unit within the array of exposure units.

For the purposes of this description, imaging offset O is the distance between an ideal dot position shown in FIG. 2B and the position exposed by a misaligned exposure unit of FIG. 3A, which offset and uncompensated dot position is shown in FIG. 3B and indicated by reference number 124 with an "o" subscript. For example, imaging offset O(b) is the distance the uncompensated dot 124$b_o$ is offset from the exposure alignment range R' and, therefore, the corresponding ideal dot position 124$b_i$. Each imaging offset O corresponds to and results from an alignment offset L of a respective uncompensated and misaligned exposure unit 122.

As shown in FIG. 3A, each alignment offset L has a magnitude and a direction. For the purposes of this description, a positive (+) direction and a negative (−) direction are defined as respectively shown by arrow P and arrow N in FIG. 3A. For example, alignment offset L(b) of exposure unit 122b has a magnitude of |L(b)| in the positive (+) direction, while alignment offset L(m−1) of exposure unit 122(m−1) has a magnitude of |L(m−1)| in the negative (−) direction. This magnitude-and-direction convention of the alignment offsets L is employed analogously herein for the imaging offsets O.

In view of the forgoing, if the alignment offset L is not compensated, then the misaligned exposure units 122 of FIG. 3A produce the uncompensated dots 124$_o$ of FIG. 3B. According to the present invention, the respective alignment offset L of the misaligned exposure units 122 are compensated for and, therefore, produce compensated dots 124$_c$ within the exposure alignment range R' as shown in FIG. 3C, as discussed in detail below.

According to the present invention, imaging offset is corrected by first determining the ideal dot positions 124$a_i$, 124$b_i$, 124$c_i$, . . . , 124$m_i$ for each exposure unit 122a, 122b, 122c, . . . , 122m, which may be done at any time during the manufacturing or the post-manufacturing process. When determined, the ideal dot positions 124$_i$ may then be either stored in a storage device of the image system 100 or communicated to the imaging system 100 from a remote location (e.g., over a network connection). A subsequent step in correcting imaging offset is determining the magnitude and the direction of the imaging offsets O(a), O(b), O(c), . . . , O(m) between the ideal dot position 124$_i$ and the uncompensated dot position 124$_o$ for each of the exposure units 122.

The imaging offset O produced by each exposure unit 122 may be determined during the manufacture of the light source 118, the EPG subsystem 102, or the entire image system 100. If carried out at the manufacturing stage, the imaging offsets O may be determined by firstly comparing the respective positions of the exposure units 122 to the known ideal alignment range R to determine the alignment offsets L. The imaging offsets O may then be respectively determined from the alignment offsets L. The magnitude of each imaging offset O may either directly or proportionally correspond to the magnitude of a respective alignment offset L, as follows:

$$|O(x)|=k|L(x)|,$$

where k is a proportionality factor greater than zero and x is an integer from 1 to m (as exemplified by the plurality of exposure units 122a–122m in FIGS. 2 and 3). The proportionality factor k may be constant for the plurality of exposure units 122 or may have a unique value for each respective exposure unit 122. The direction of each imaging offset O directly corresponds to that of a respective alignment offset L.

After determining magnitude and direction, compensation for imaging offset for each dot is accomplished by matching the uncompensated dot position 124$_o$ to the ideal dot position 124$_i$. For the ideally aligned array shown in FIG. 2A, each exposure unit 122 is actuated at an ideal actuation time to result in the ideal dot positions 124$_i$ of FIG. 2B. According to an exemplary embodiment, a time factor Δt is incorporated to the EPG subsystem 102 and, more specifically, into the light sources 118 to modify the ideal actuation time of each exposure unit 122 depending upon the imaging offset O thereof.

More specifically, as the photoreceptor belt 106 moves in the direction indicated by arrow A at a know velocity v, and as the magnitude and the direction of the imaging offset O for each exposure unit 122 is known, then the time factor Δt for any exposure unit 122x may be determined by:

$$\Delta t(x)=O(x)\div v.$$

The magnitude of each imaging offset O determines the amount of time t to modify the ideal actuation time for each exposure unit 122, while the direction of each imaging offset O determines whether the exposure unit 122 is actuated earlier or later than the ideal actuation time thereof.

For example, if the imaging offset O for exposure unit 122b has a magnitude of 0.1 millimeter (mm) in the positive (+) direction, and if the velocity v of the photoreceptor belt 106 is 100 mm per second, then the time factor Δt of exposure unit 122b is:

$$\Delta t(122b)=(0.1 \text{ mm})\div(100 \text{ mm/s})=0.001 \text{ s}=1 \text{ ms}.$$

In addition, if the imaging offset O for exposure unit 122(m−1) has a magnitude of 0.08 mm in the negative (−) direction, then the time factor Δt of exposure unit 122(m−1) is:

$$\Delta t[122(m-1)]=-(0.08 \text{ mm})\div(100 \text{ mm/s})=-0.0008 \text{ s}=-0.8 \text{ ms}.$$

Accordingly, as the photoreceptor belt 106 passes by the array of exposure units 122, exposure unit 122(m−1) will actuate 0.8 ms sooner than an ideal actuation time to compensate for imaging offset O(m−1), while exposure unit 122b will actuate 1 ms later than an ideal actuation time to compensate for imaging offset O(b). It follows that the time factor At for each exposure unit 122 has a sign (i.e., either positive or negative) that is indicative of the direction of the imaging offset O for each exposure unit 122.

This pre-actuation and post-actuation of exposure units 122 from the ideal actuation time results in respective compensated dots $124a_c$, $124b_c$, $124c_c$, ..., $124m_c$ that are aligned within the exposure alignment range R' as shown in FIG. 3C. The compensated dots $124_c$ result in an image formed on sheet material by the imaging system 100 with high resolution and clarity. Furthermore, in multicolor imaging systems, each compensated dot is properly registered to result in true color. Compensating for the imaging offset O may be accomplished using both firmware or software as described more fully below.

Rather than being a quantity of time as described above, the time factor may be calculated as a constant τ that actuates an exposure unit 122 to produce a dot within the exposure range R'. For example, the time at which an exposure unit 122 is actuated for compensation, represented by $t_c$, may be written as the product of a time constant τ and an ideal actuation time $t_i$ as follows:

$$t_c = \tau \times t_i.$$

Figure 4A:
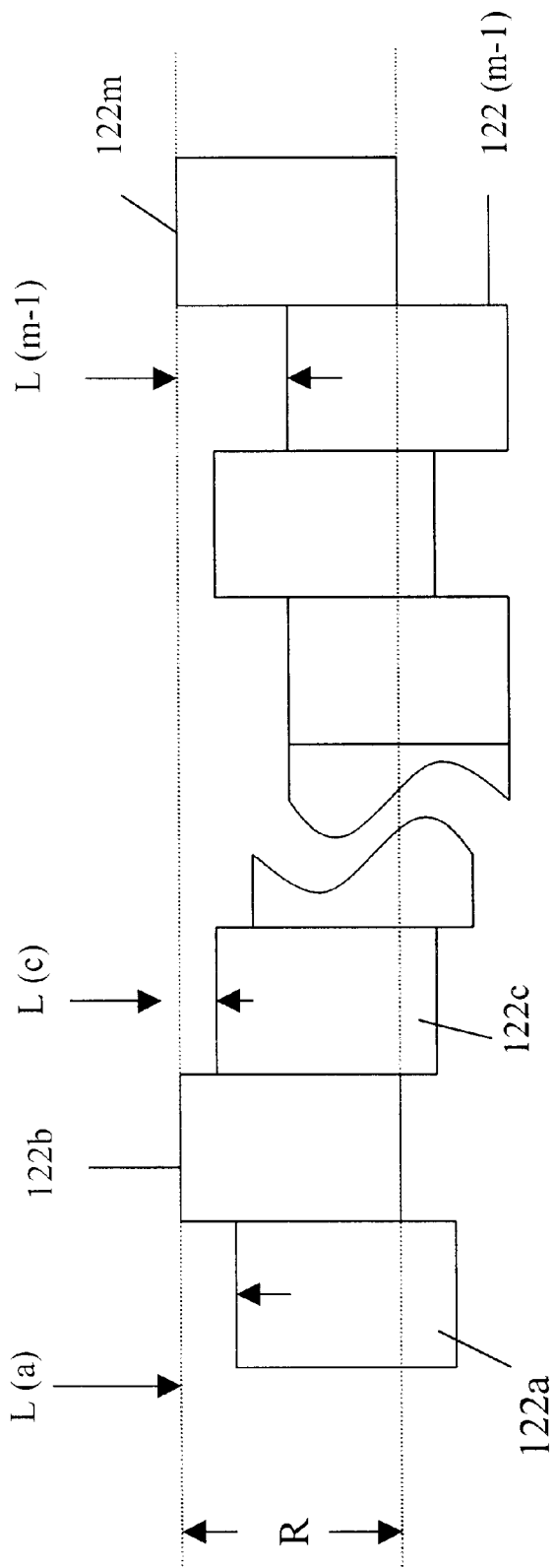
FIG. 4A is a diagram view of an array of exposure units that are out of alignment with respect to an ideal alignment range.
Figure 4B:
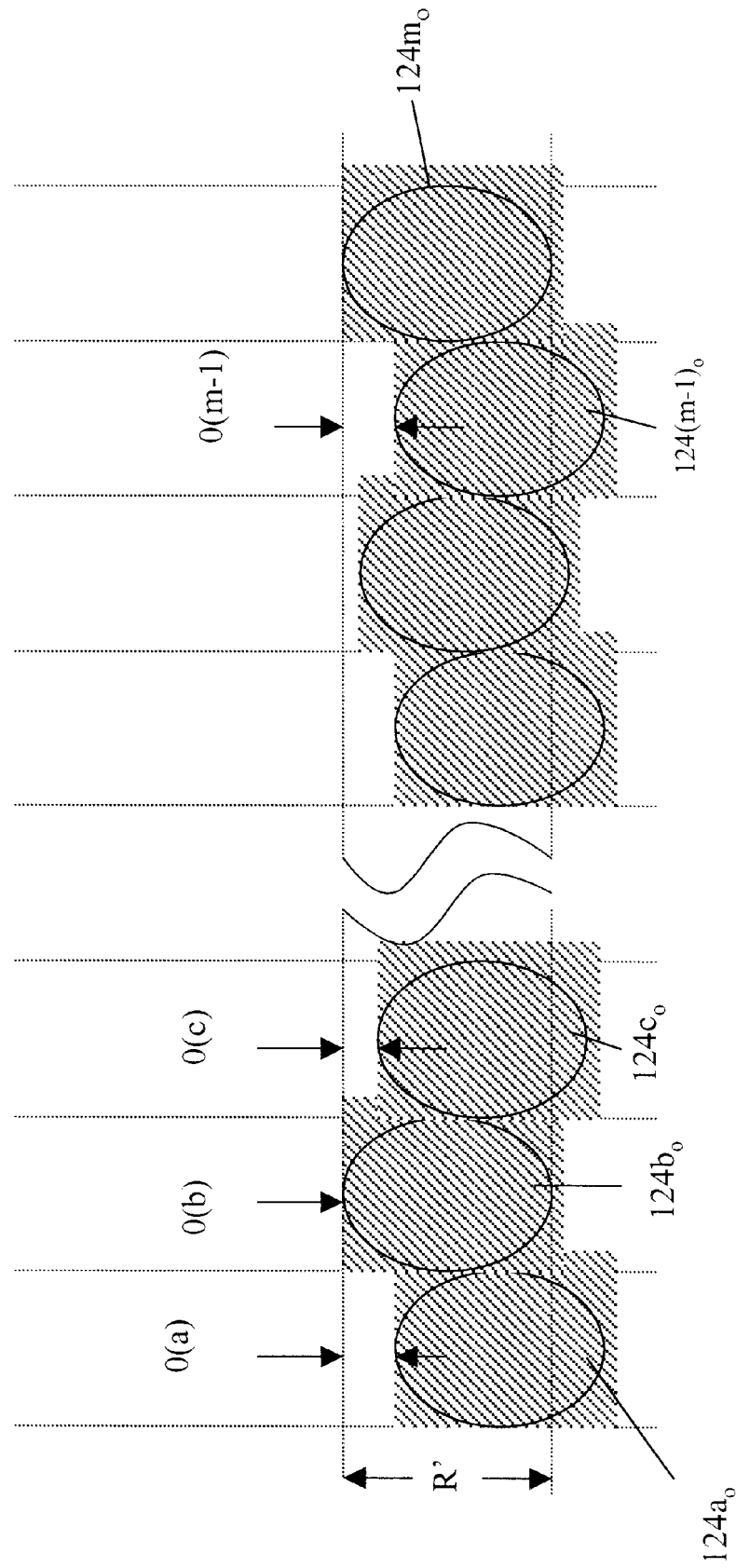
FIG. 4B is a diagram view of dots exposed by the exposure units of FIG. 4A that suffer from imaging offset.

An alternative image-offset compensating embodiment of the invention is described with reference to FIGS. 4A and 4B. Analogous to that described above in relation to FIG. 3A, the exposure units 122 are out of alignment with respect to the alignment range R by an offset L. Accordingly, if actuated without compensation, the misaligned exposure units 122 produce dots that are correspondingly offset from the ideal dot position and the exposure alignment range R', as shown in FIG. 4B.

Figure 4C:
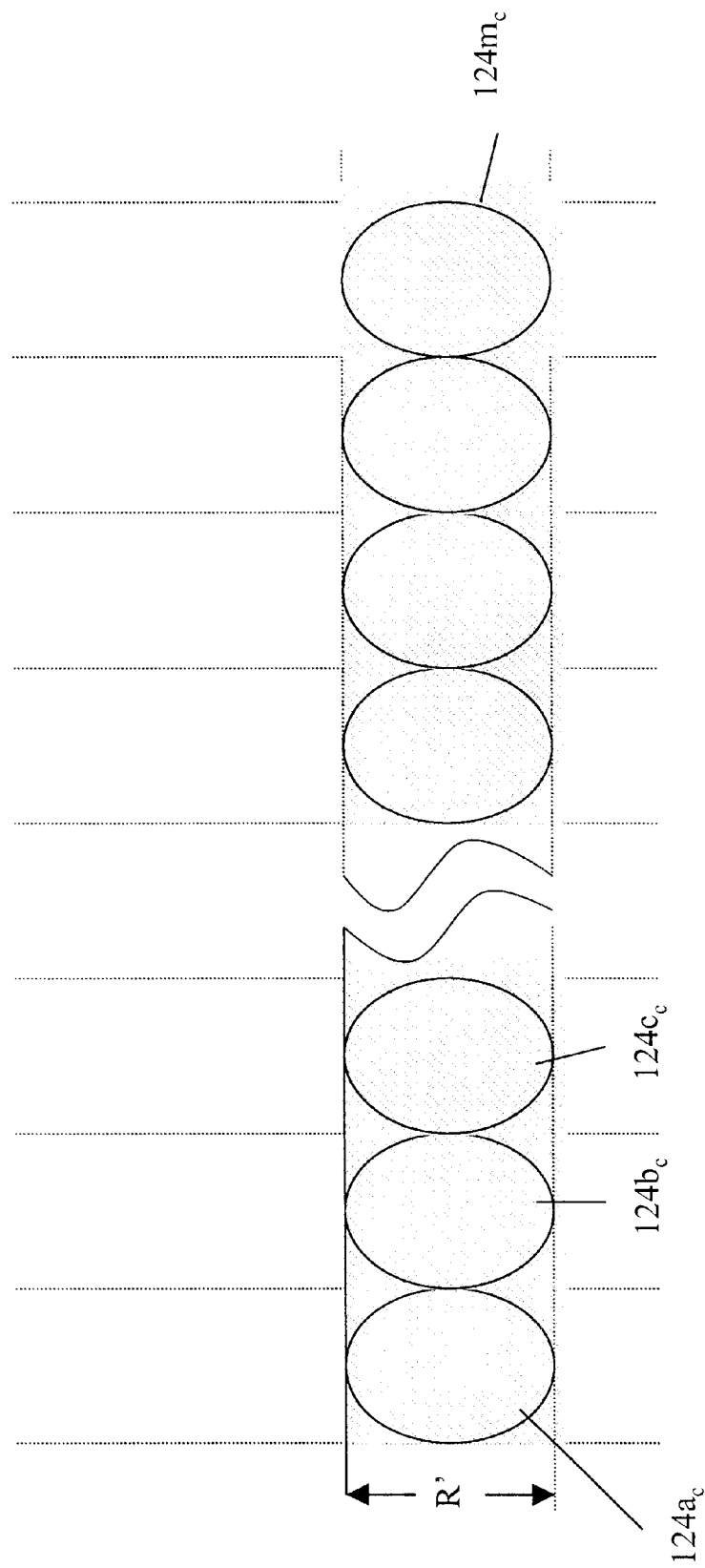
FIG. 4C is a diagram view of aligned dots that have been compensated in accordance with the principles of the present invention.

According to this exemplary embodiment, rather than having the alignment range R fixed with each exposure unit having either a positive (+) offset or a negative (−) offset as described above, the alignment range R is adjusted or normalized to the position of a single one of the exposure units 122, for example, the exposure unit having an alignment offset L with the greatest magnitude in the positive direction. In the example shown in FIG. 4A, such an exposure unit is exemplified by either exposure unit 122b or 122m. Accordingly, each alignment offset L has a magnitude. The direction of each alignment offset L is assumed to be negative. Correspondingly, the time factor At for each exposure unit is always negative; that is, the time factor is always a time delay in actuating the exposure units 122 to compensate for the imaging offset O, thereby yielding compensated dots 124c within the exposure range R' as shown in FIG. 4C.

Rather than compensating for imaging offset O during the manufacturing stage as described above, compensation may take place after the exposure units 122 have been incorporated into the EPG subsystem 102. According to this embodiment of the invention, imaging offset is compensated during a single compensating stage for the EPG subsystem 102, while the manufacturing is occurring. More specifically, after the exposure units have been manufactured and incorporated into the light sources 118 (or into the EPG module 120 or the EPG subsystem 102), the manufacturer performs the compensation method described above to compensate for the imaging offset during a single compensating procedure.

Another embodiment of the invention compensates for imaging offset after the exposure units 122 have been incorporated into the imaging system 100, such as a multicolor printer. If imaging-offset compensation takes place after the manufacturing of the imaging system 100, then a number of compensating procedures are available. More specifically, the compensating method of the present invention described above may be performed to compensate for imaging offset throughout the life of the imaging system 100, the EPG subsystem 102, the light sources 118, or the EPG module 120. Thus, if any post-manufacturing damage occurs on any component of the imaging system 100 resulting in misaligned exposure units, then the imaging system 100 may communicate with software or firmware to perform the present compensating method either locally (i.e., within the EPG subsystem 102, the EPG module 120, or the light source 118) or remotely (i.e., over a data network, such as the Internet, that is connected to the imaging system 100).

According to a further embodiment, imaging offset need not be determined physically within the imaging system 100. According to this embodiment, the imaging system 100 is connected through communication media (e.g., wire or wireless media) to a network, such as a local-area network (LAN), a wide-area network (WAN), or the Internet. Although software performing the present compensating methods may be stored within the imagine system 100, the EPG subsystem 102, the EPG module 120, or the light sources 118, such software or firmware may be remotely located with the resulting imaging-offset compensation being transmitted to the imaging system 100 through the data network.

In alternative embodiments, the data network may be used to communicate specific identification information of the imaging system 100, the EPG subsystem 102, the EPG module 120, or the light sources 118 to a remote location, thereby receiving imaging-offset data specific for that particular component. Accordingly, the imaging system 100 and any of its components may have unique identification information such as a serial number or the like that specifically identifies the component, e.g., the EPG subsystem 102. After purchase, the imaging system 100 may be connected to a network so that the identification information can be transmitted to a remote location with a computer system on which is stored the imaging-offset data for the particular EPG subsystem 102. Upon receipt of the unique identification information, the remote computer system may then transmit the imaging-offset data corresponding to the identification information to the EPG subsystem 102 to compensate for the imaging offset. This embodiment is particularly useful when the EPG subsystem 102 or the EPG module 120 is replaced with another such unit which would have different imaging-offset data corresponding to its unique identification information.

The imaging-offset compensation methods of the present invention may be implemented using any device and methodology for determining the offset, including distance and direction (if necessary), of each exposure unit. In addition, any device or methodology for matching the dot position (using the time factor) to the ideal dot position may be employed.

Figure 5:
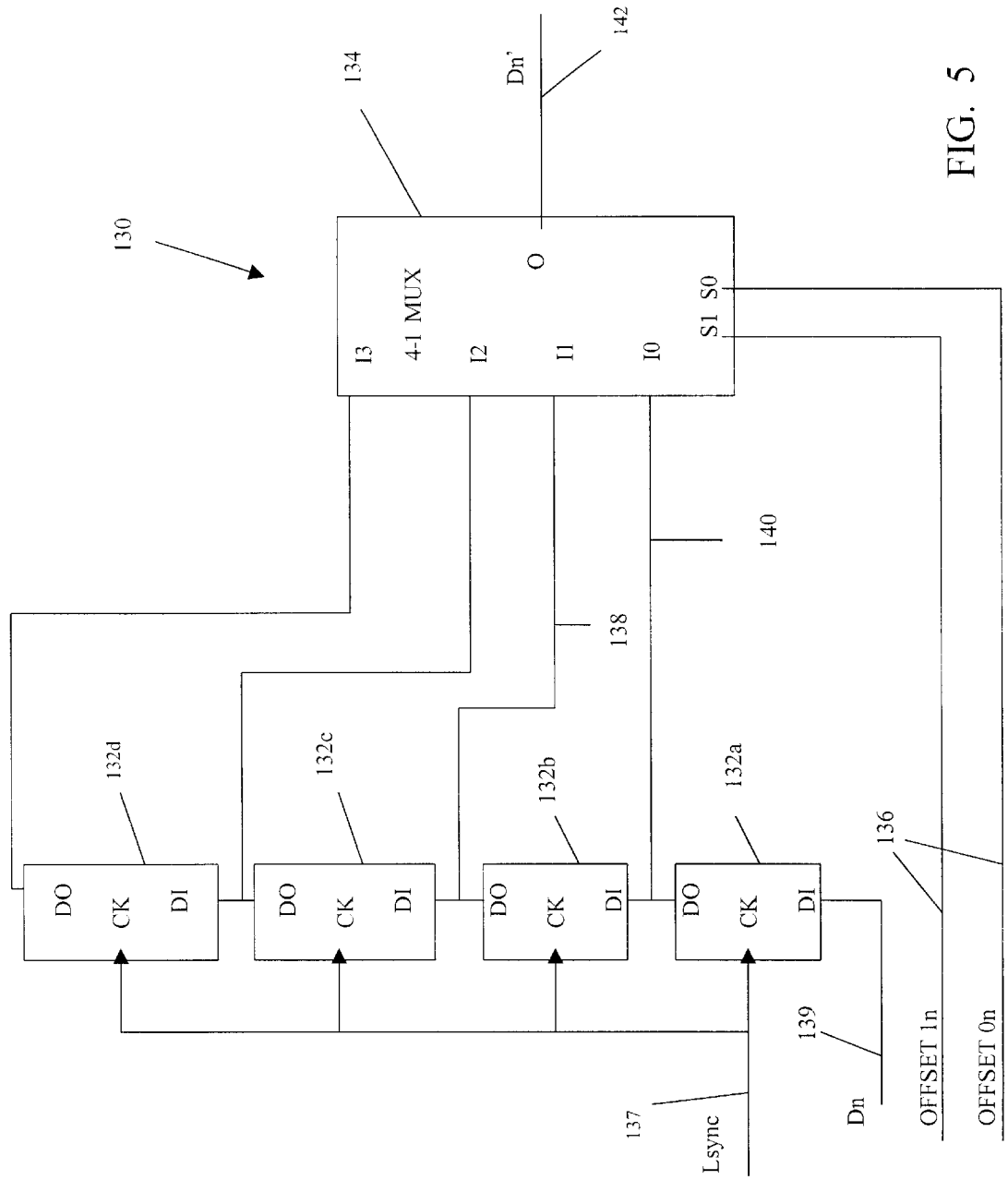
FIG. 5 is a schematic view of an exemplary embodiment of a delay device of the present invention.

One exemplary hardware embodiment of an imaging-offset compensation unit configured in accordance with the principles of the present invention is shown in FIG. 5 and indicated by reference numeral 130. Exemplary compensation unit 130 includes a plurality of flip-flops 132, for example, four D flip-flops 132a, 132b, 132c, and 132d, and a 4×1 multiplexer 134. Generally, port DO of each flip-flop 132 is connected to port DI of a subsequent flip-flop and to an input of the multiplexer 134. The CK inputs of the flip-flops 132 are coupled to Lsync line 137 which is used to shift uncompensated image data (Dn) into the flip-flops 132. "Dn" signifies that this uncompensated image data is to be placed on the nth position of an appropriate exposure unit 122. Exemplary compensating device 130 functions as a delaying device that is capable of delaying the formation of dots that collectively form the latent image on the photoreceptor belt 106 by the time factor corresponding to the imaging offset of each exposure unit 122. The time factor descried above represents the unit of pixel line. For instance, a time factor of two represents a delay of two pixel lines. OFFSET lines 1n and 0n, indicated in FIG. 5 by reference numeral 136, control the number of pixel lines to be delayed. In the exemplary embodiment shown in FIG. 5, up to three pixel lines of delay are provided. In other exemplary embodiments, greater numbers of pixel lines of delay are provided. For example, in one alternative embodiment, compensation unit 130 includes three OFFSET lines, eight D flip-flops, and an 8-to-1 multiplexer, to provide up to seven pixel lines of delay.

In operation, Lsync line 137 preferably shifts data Dn into the respective flip-flops 132a, 132b, 132c, 132d sequentially by image line. Data Dn is clocked into flip-flops 132a, 132b, 132c, 132d in sequence, by a time factor corresponding to the imaging offset O of one of the exposure units 122 defined by OFFSET signals input on lines 136. As mentioned above, the time factor corresponds to the amount of time needed to delay the formation of the dot by an exposure unit. For example, if a dot to be formed is desirably to be delayed by a factor of 1, then line 136 sends a signal indicative of this factor to the multiplexer 134 which, in turn, directs the signal to line 138 and port 11. Flip-flop 132b delays the signal on line 139 by a factor of 1 and thereafter returns the signal through line 140 to the multiplexer 134. The multiplexer 134 then outputs the delayed signal to port O and line 142 that is connected to an input of an exposure unit. The delayed signal actuates the exposure unit to form a compensated dot on the photoreceptor belt 106. If a dot to be formed is desirably delayed by a factor of 2 or more, then the signal on line 136 selects the appropriate flip-flop 132 for the corresponding delay factor in order to properly delay the formation of the dot. In other exemplary embodiments, other types of firmware are used to perform the function of matching the dot position to the ideal dot position.

In other embodiments, software may be used in conjunction with a processor or as part of a computer system to determine the imaging offset O and to match the dot position to the ideal dot position. The software may be stored on a storage device of any type, such as magnetic media, optical media, DVDs, CD ROMs, RAMs, EPROM, EEPROM, or any other type of media suitable for storing data or instructions. The software may also act as a delaying device that is able, through computer code, to accept the offset and to delay the formation of the image by the offset. It is noted that the hardware and software to implement the method of the present invention may be located within the housing 104 or on various components of the imaging system 100, including on the EPG subsystem 102, the light sources 118, or the EPG module 120. Alternatively, the compensation software or hardware may also be outside of the housing 104 and in communication with the imagine system 100.

Returning to the description of the present invention shown in FIG. 1, exemplary imaging system 100 may include a supply tray 150 for holding sheet material 152 such as paper or transparencies. A roller 154 engages one of the sheets 152 from the supply tray 150 and sends the sheet through a transfer station 156 where the latent image form on the photoreceptor belt 106 is transferred to the sheet with toner. A fuser 158 fixes the toner to the sheet and transfers the sheet with the fused image to an output tray 160.

For multicolor printing, the photoreceptor belt 106 is driven past the four printing stations 114 which produce four images of unique color in superimposed relation on the outer surface 108 of the belt 106, which images collectively form a latent image. The latent image is transferred from the belt 106 to sheet material at the transfer station 156. A cleaning unit 162 removes any residual developer and toner from the outer surface 108 of the photoreceptor belt 106 prior to passing by a first of the charging units (i.e., unit 116a).

As mentioned above, a compensating module including software and/or hardware for determining the imaging offset O and the corresponding compensation factor may be located at any appropriate location within the imaging system 100. For example, the compensating module, which is indicated by reference numeral 164, may incorporated within either the EPG module 120 as indicated at 164a, one or more of the light sources 118 as indicated at 164b, the EPG subsystem 102 as indicated at 164c, or the housing 104 as indicated at 164d. As described above, compensating for imaging offset results in an image that is clear and crisp with properly aligned registry which is particularly beneficial for multicolor images.

Figure 6:
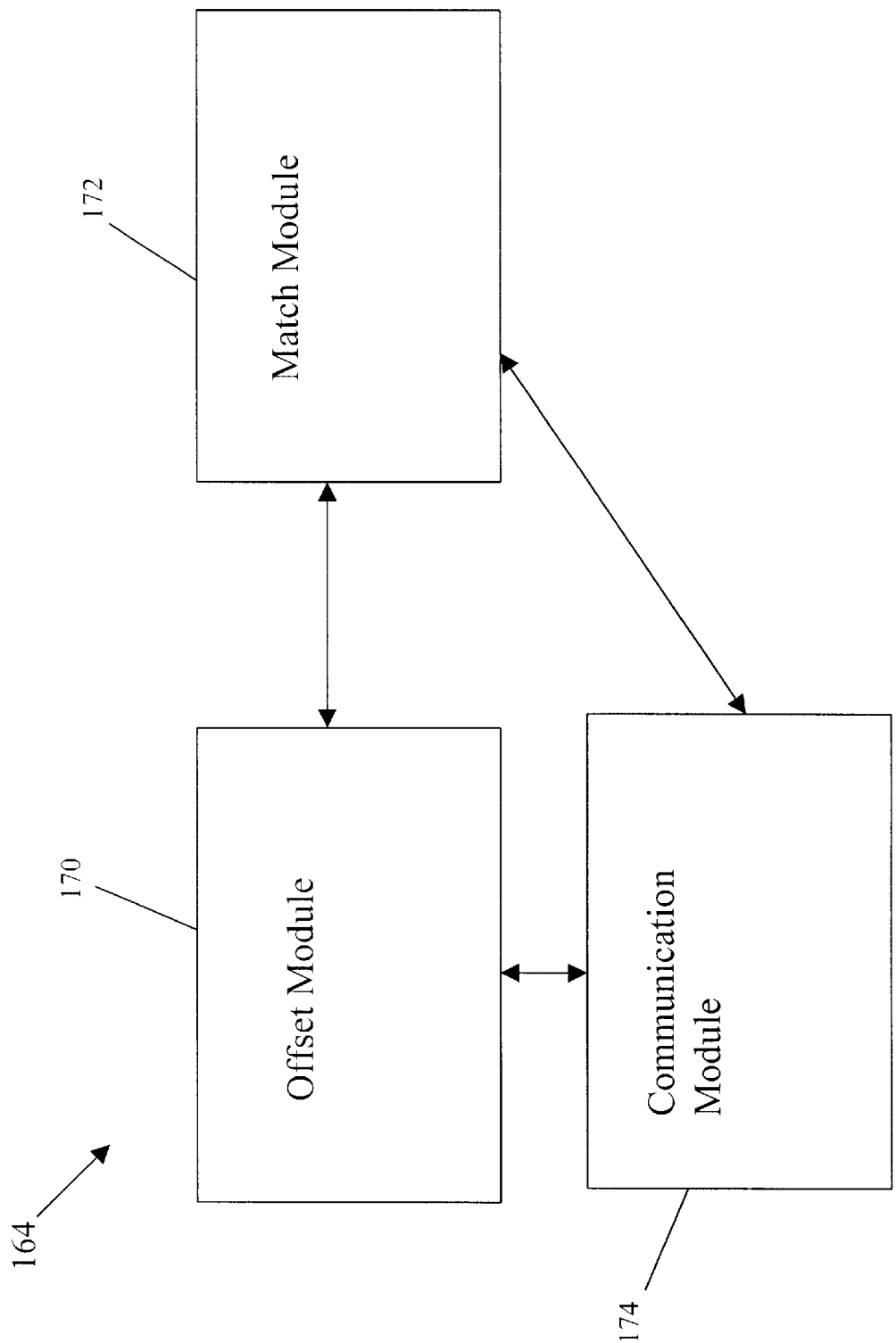
FIG. 6 is a block diagram of a software module configured in accordance with the principles of the present invention.

An exemplary embodiment of the compensating module 164 is illustrated in FIG. 6 as a software module. Exemplary software compensating module 164 includes code for implementing the functionality described on each block of FIG. 6. For example, an offset module 170 includes code and data regarding magnitude and other parameters for determining the imaging offset O in accordance with the methodology described above. A match module 172 includes code for matching an uncompensated dot position to a respective ideal dot position to compensate for the imaging offset. A communication module 174 includes code for communicating with the imaging system 100. The software code represented by the blocks may be stored on any storage device as described above and may be run using any processor or computer system.

Exemplary software module 164 may be configured as a plurality of computer-readable instructions stored on a computer-readable medium as known in the art. Alternatively, the computer-readable instructions may be located in an electronic signal that is transmitted over a data network to perform the methods of the invention when loaded into a computer system. The electronic signal may be transmitted via a data network or via cable, satellite, cellular, or other suitable transmitting means.

Figure 7A:
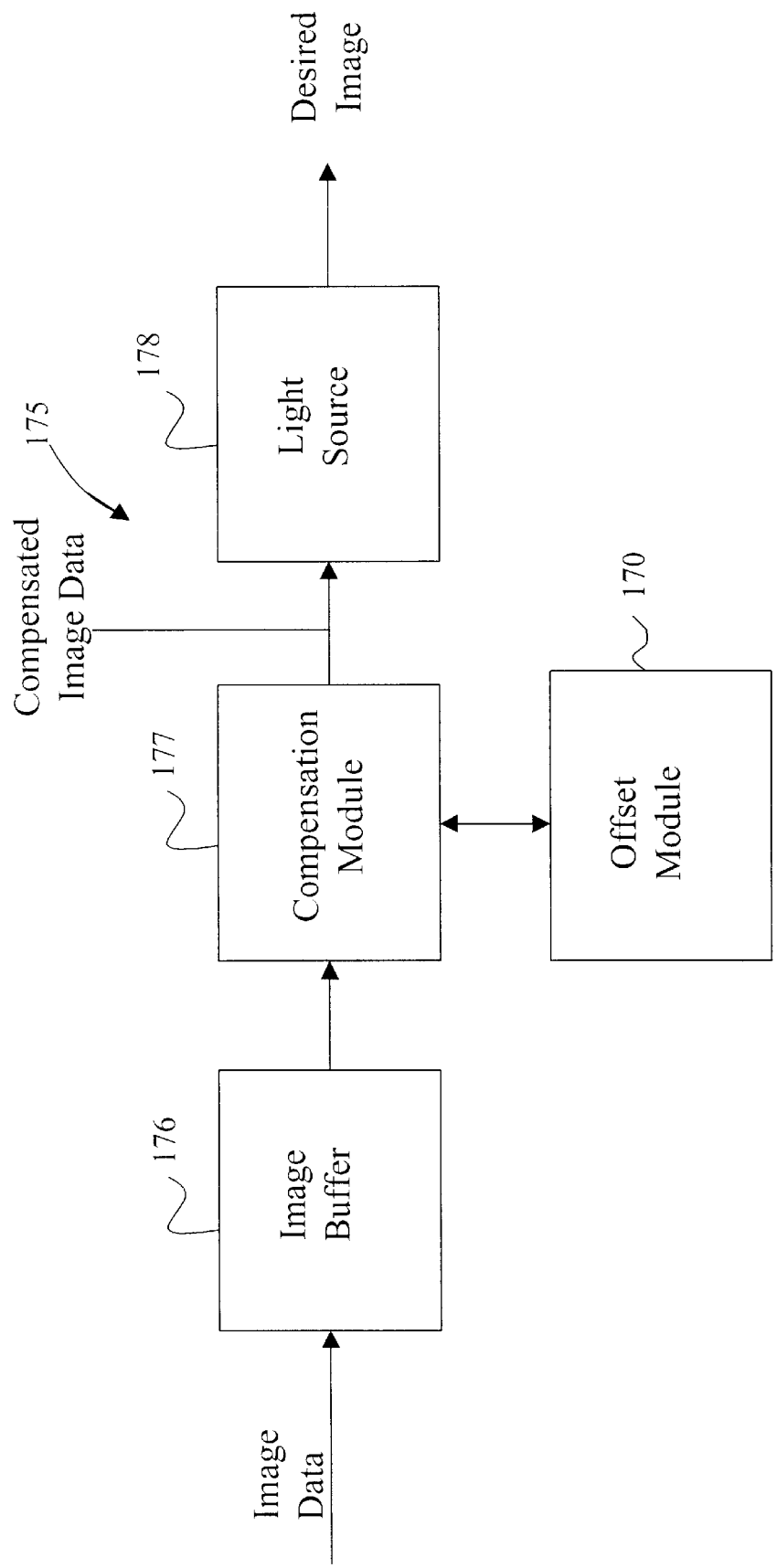
FIG. 7A is a block diagram of an exemplary software module configured such that a compensation function is performed after image data is stored in an image buffer, in accordance with principles of the present invention.
Figure 7B:
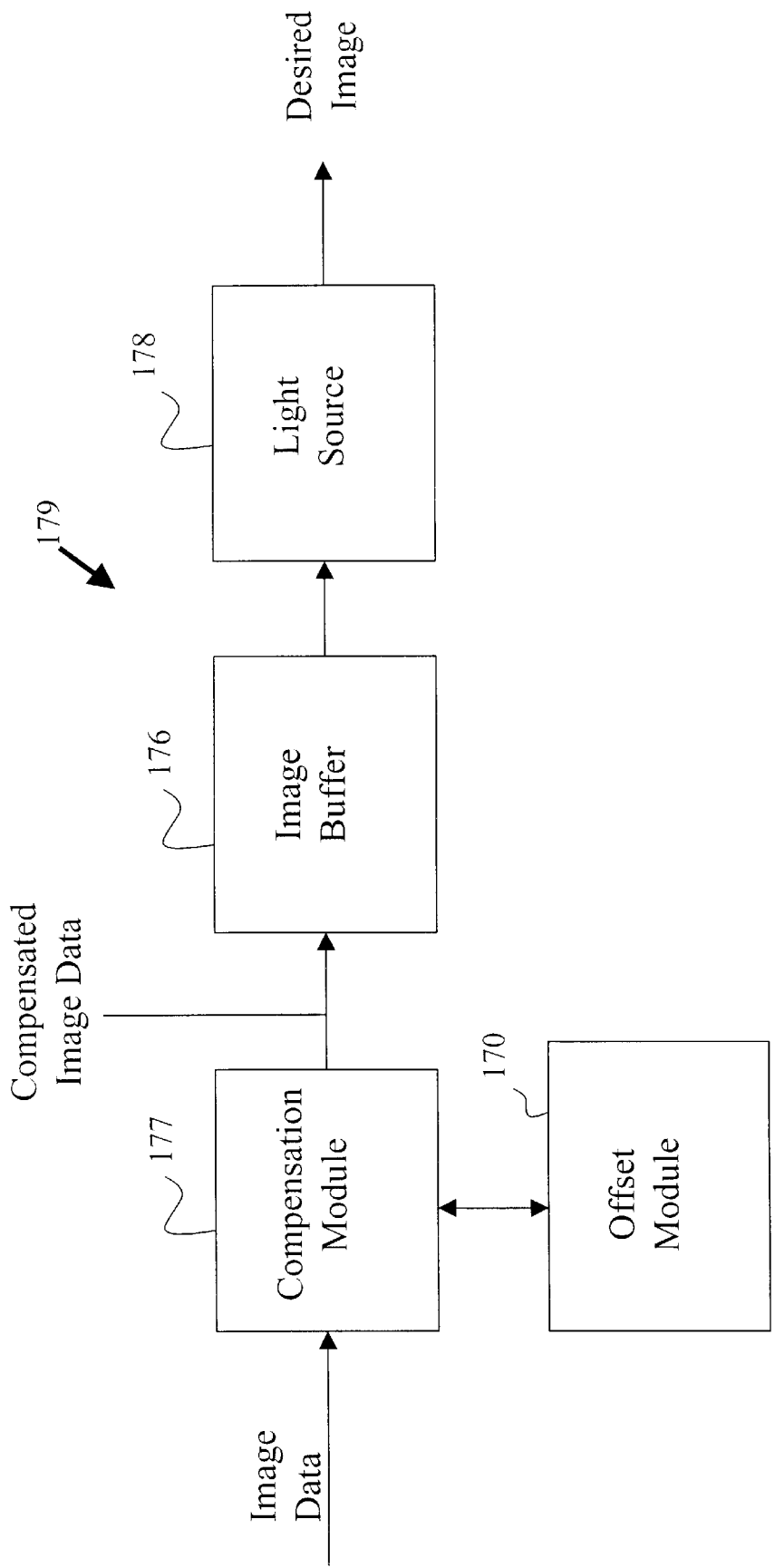
FIG. 7B is a block diagram of an exemplary software module configured such that a compensation function is performed before image data is stored in an image buffer, in accordance with principles of the present invention.

Exemplary compensation modules constructed according to the present invention have various configurations, particularly with respect to an image buffer in which image data is stored for processing. For example, FIG. 7A shows a configuration 175 in which image data, such as rendered image process ("RIP") data, is stored in an image buffer 176 before a compensation module 177 processes the data. In another example, FIG. 7B shows a configuration 179 in which the image data is processed by compensation module 177 before the data is stored in image buffer 176. In both FIGS. 7A and 7B, the image data is compensated by compensation module 177 using software and/or hardware configurations as described above. For purposes of illustration, offset module 170 is shown as separated from compensation module 177, as opposed to the configuration of FIG. 6.

In FIG. 7A, the image data is stored in image buffer 176 before being passed to compensation module 177. Image buffer 176 embodied, in one example, in conventional PC memory. The image data is preferably transferred to and from image buffer 176 using direct memory access ("DMA"). After storage in image buffer 176, the image data is retrieved by compensation module 177 and compensated using techniques described above. Compensation module 177 ouptuts compensated image data to a light source 178, such as a LPH, to produce an electrostatic charge image. The configuration in FIG. 7B functions similar to that of FIG. 7A, except that the compensation module 177 is situated on the opposite side of image buffer 176 so that the image data is compensated before being stored in image buffer 176. The configurations of FIGS. 7A and 7B are advantageous because, in both cases, the compensation module 177 is separated from the light source 178. By doing so, the cost of the light source is reduced significantly.

Figure 8:
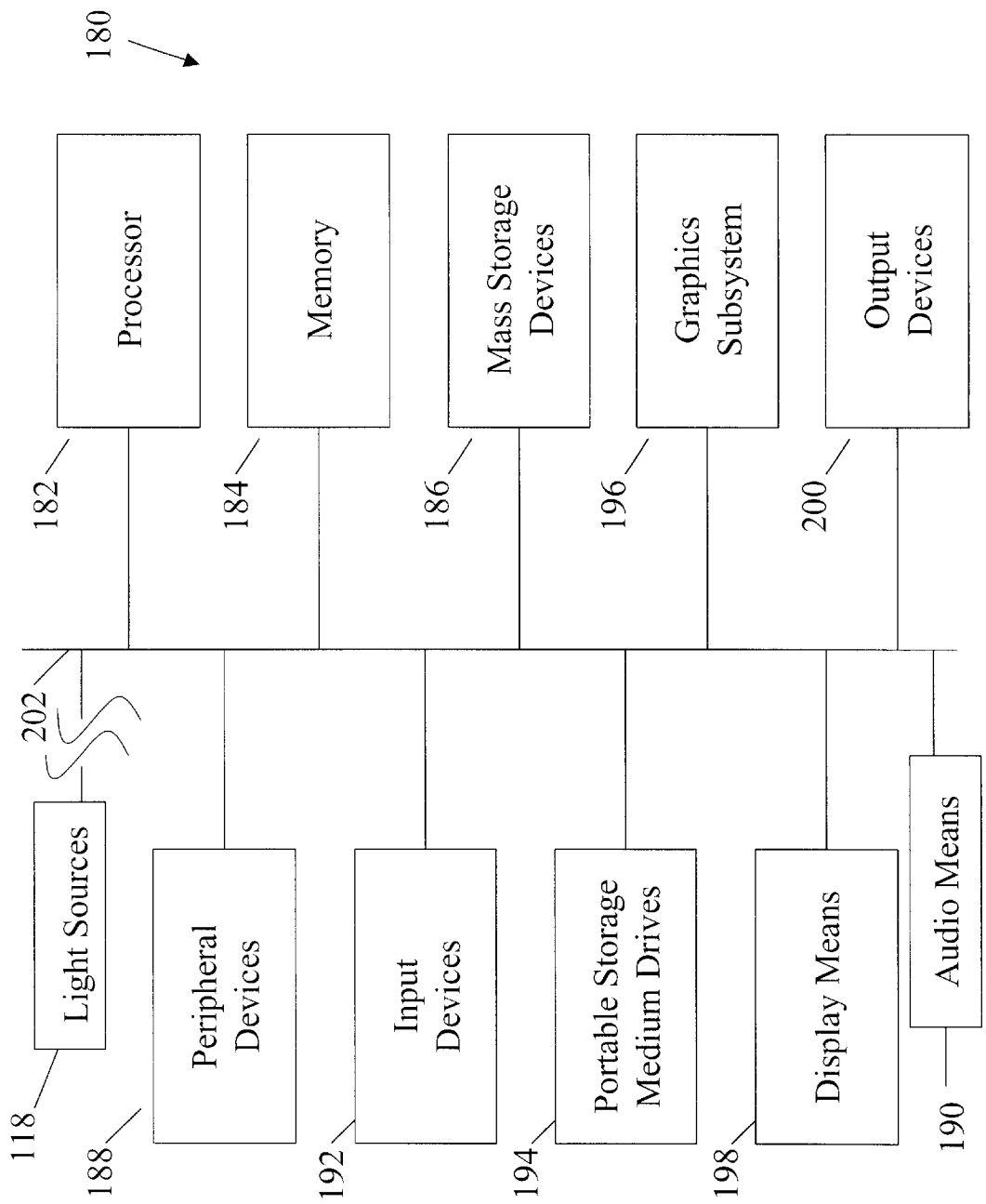
FIG. 8 is a block diagram of an exemplary computer system for implementing the compensation methodology of the present invention.

A computer system 180 configured in accordance with the principles of the present invention is illustrated in FIG. 8 with a high-level block diagram. Exemplary system 180 includes a processor 182 and memory 184. Processor 182 may include a single microprocessor or a plurality of microprocessors for configuring the computer system 180 as a multi-processor system. Memory 184 may store instructions and data for execution by processor 182. Depending upon the extent of software implementation in the system 180, memory 184 may store executable code when in operation. Memory 184 may include, for example, banks of dynamic random access memory (DRAM) as well as high-speed cache memory.

Exemplary system 180 may also incorporate any combination of additional devices, including but not limited to a mass storage device 186, one or more peripheral devices 188, an audio device 190, one or more input devices 192, one or more portable storage medium drives 194, a graphics subsystem 196, a display 198, and one or more output devices 200. For purposes of simplicity, the components shown in FIG. 8 are connected via a single bus 202; however, the components may be connected through one or more communication media as known in the art. For example, processor 182 and memory 184 may be connected via a local microprocessor bus; and the mass storage device 186, the peripheral devices 188, the portable storage medium drives 194, and the graphics subsystem 196 may be connected via one or more input/output (I/O) buses. As shown in FIG. 8, the light sources 118 are in communication with the computer system 180 for actuation of the exposure units 122 based on the time factor.

Mass storage device 186, which may be implemented as a magnetic or an optical disk drive, is preferably a non-volatile storage device for storing data and instructions for use by processor 182. The mass storage device 186 may store client/server information, code for carrying out the methods of the invention, and computer instructions for the processor. The computer instructions for implementing the methods of the present invention also may be stored in processor 182.

Portable storage medium drive 194 may operate in conjunction with a portable non-volatile storage medium, such as a floppy disk or other computer-readable medium, to input and output data and code to and from the computer system 180. According to an exemplary embodiment, the method of the present invention is implemented using computer instructions that are stored on such a portable medium and input to the computer system 180 via the portable storage medium drive 194.

The peripheral devices 188 may include any type of computer support device, such as an input/output (I/O) interface, to add additional functionality to the computer system 180. For example, the peripheral devices 188 may include a network interface card for interfacing the computer system 180 to a network, a modem, and the like.

The input devices 192 provide a portion of a user interface and may include an alphanumeric keypad or a pointing device such as a mouse, a trackball, a stylus, or cursor direction keys. Such devices provide additional means for interfacing with a customized media list and customized media of the present invention.

The graphics subsystem 196 and the display 198 provide output alternatives of the system 180. The display 198 may include a cathode ray tube (CRT) display, a liquid crystal display (LCD), or other suitable devices that enable a user to view the customized media list or the customized media of the invention. The graphics subsystem 196 may receive textual and graphical information and then process the information for output to the display 198.

The audio means 190 may include a sound card that receives audio signals from a peripheral microphone. In addition, the audio means 190 may include a processor for processing sound. The output devices 200 may include suitable output devices such as speakers, printers, and the like.

Each of the components of exemplary computer system 180 are intended to represent a broad category of computer components that are well known in the art. Exemplary computer system 180 represents one platform that can be used for implementing the methods of the present invention. Numerous other platforms can also suffice, such as Macintosh-based platforms, platforms with different bus configurations, networked platforms, multi-processor platforms, other personal computers, workstations, mainframes, navigational systems, and the like.

Although the present invention has been described in terms of the exemplary embodiments, numerous modifications and/or additions to the above-described embodiments would be readily apparent to one skilled in the art. It is intended that the scope of the present invention extends to all such modifications and/or additions and that the scope of the present invention is limited solely by the claims set forth below.

What is claimed is:

1. An electrophotographic (EPG) module for printing images free of imaging offset, the EPG module comprising:
   a substrate;
   a light source including a plurality of exposure units each for producing a dot on the substrate;
      the plurality of exposure units including at least one misaligned exposure unit that is out of alignment with the other exposure units; and
      each of the misaligned exposure units producing a dot at an uncompensated dot position when uncompensated for misalignment thereof such that each of the misaligned exposure units has an imaging offset corresponding to a distance defined between the uncompensated dot position and an ideal dot position;
   a storage device for storing the imaging offset for each of the exposure units; and
   a matching device in communication with the storage device and the light source for causing each of the misaligned exposure units to be actuated based on the imaging offset to produce a dot in the ideal dot position.

2. The EPG module of claim 1, wherein the matching device includes a delaying device for causing each of the misaligned exposure units to be actuated at a time later than an ideal actuation time that produces a dot in the ideal dot position.

3. The EPG module of claim 1, wherein the storage device stores identification information unique to the EPG module.

4. The EPG module of claim 1, wherein the substrate is a photoreceptor belt.

5. A light-emitting diode print head (LPH) comprising:
   a plurality of exposure units each for producing a dot on a substrate;
      the plurality of exposure units including at least one misaligned exposure unit that is out of alignment with the other exposure units; and
      each of the misaligned exposure units producing a dot at an uncompensated dot position when uncompensated for misalignment thereof such that each of the misaligned exposure units has an imaging offset corresponding to a distance defined between the uncompensated dot position and an ideal dot position;
   a storage device for storing the imaging offset for each of the exposure units; and
   a matching device in communication with the storage device and a light source for causing each of the misaligned exposure units to be actuated based on the imaging offset to produce a dot in the ideal dot position.

6. The LPH of claim 5, wherein the matching device includes a delaying device for causing each of the misaligned exposure units to be actuated at a time later than an ideal actuation time that produces a dot in the ideal dot position.

7. The LPH of claim 5, wherein the storage device stores identification information unique to an EPG module.

8. An imaging system comprising:
   a photoreceptor belt;
   a light source including a plurality of exposure units each for producing a dot on the photoreceptor belt;
      the plurality of exposure units including at least one misaligned exposure unit that is out of alignment with the other exposure units; and
      each of the misaligned exposure units producing a dot at an uncompensated dot position when uncompensated for misalignment thereof such that each of the misaligned exposure units has an imaging offset corresponding to a distance defined between the uncompensated dot position and an ideal dot position; and
   a processor in communication with the light source for causing each of the misaligned exposure units to be actuated based on the imaging offset to produce a dot in the ideal dot position.

9. The imaging system of claim 8, wherein the processor delays the actuation of the exposure units to be at a time later than an ideal actuation time that produces a dot in the ideal dot position.

10. A method of compensating for imaging offset of a dot produced by an exposure unit, on a substrate, in an imaging system, the imaging system comprising an array of exposure units each producing a dot having an uncompensated dot position that is out of alignment with an ideal dot position, the method comprising:
   determining the imaging offset as a distance between the ideal dot position and the uncompensated dot position for each exposure unit;
   matching the uncompensated dot position to the ideal dot position
   the determining step comprising determining the imaging offset as a distance between the ideal dot position and the uncompensated dot position for each exposure unit; and
   the matching step comprising matching the uncompensated dot position to the ideal dot position for each exposure unit.

11. The method of claim 10, wherein the matching step further comprises determining a time factor for each exposure unit based on the imaging offset.

12. The method of claim 11, further comprising actuating each of the exposure units at a time modified by the time factor thereof to form a latent image on the substrate.

13. The method of claim 12, further comprising developing the latent image on sheet material.

14. A method of compensating for imaging offset of a dot produced by an exposure unit on a substrate in an imaging system, the dot having an uncompensated dot position that is out of alignment with an ideal dot position, the method comprising:
   determining the imaging offset as a distance between the ideal dot position and the uncompensated dot position;
   retrieving the imaging offset from a network; and
   matching the uncompensated dot position to the ideal dot position.

15. The method of claim 14, wherein the retrieving step further comprises retrieving the imaging offset from the Internet.

* * * * *